US012661671B2

(12) United States Patent
Svendsen

(10) Patent No.: US 12,661,671 B2
(45) Date of Patent: Jun. 23, 2026

(54) PORTABLE AIRLESS FLUID DISPENSING APPARATUS AND VALVES

(71) Applicant: Harbor Freight Tools USA, Inc., Calabasas, CA (US)

(72) Inventor: John M. Svendsen, Greer, SC (US)

(73) Assignee: Harbor Freight Tools USA, Inc., Calabasas, CA (US)

( * ) Notice: Subject to any disclaimer, the term of this patent is extended or adjusted under 35 U.S.C. 154(b) by 250 days.

(21) Appl. No.: 18/539,124

(22) Filed: Dec. 13, 2023

(65) Prior Publication Data

US 2025/0196169 A1 Jun. 19, 2025

(51) Int. Cl.

*B05B 9/04* (2006.01)
*B05B 9/01* (2006.01)
*B05B 9/08* (2006.01)

(52) U.S. Cl.

CPC .............. *B05B 9/0413* (2013.01); *B05B 9/01* (2013.01); *B05B 9/0866* (2013.01)

(58) Field of Classification Search

CPC ....... B05B 9/0413; B05B 9/01; B05B 9/0866; B05B 1/3046; B05B 9/0861; B05B 9/0403; B05B 12/087

See application file for complete search history.

(56) References Cited

U.S. PATENT DOCUMENTS

2006/0124773 A1* 6/2006 Weaver .................. B05B 1/185 239/569
2007/0095938 A1* 5/2007 Rioux ..................... B01F 27/90 239/398
2011/0259670 A1* 10/2011 Amilien .................. F16N 39/04 184/3.2
2021/0370328 A1* 12/2021 Fideler .................. B05B 1/3046
2025/0196169 A1* 6/2025 Svendsen .............. B05B 9/0861

FOREIGN PATENT DOCUMENTS

DE 19814532 A1 * 10/1999 ........... B05B 1/3046
DE 202011051633 U1 * 12/2011 ........... B05B 1/3013

* cited by examiner

*Primary Examiner* — Bob Zadeh
(74) *Attorney, Agent, or Firm* — McAndrews Held & Malloy, Ltd.

(57) ABSTRACT

An airless fluid dispensing apparatus, a stem-less spray valve, and a pressure relief valve are disclosed. The stem-less spray valve comprises a generally cylindrical valve body; a fluid conduit, operable to allow a flow of the fluid from a pump, at least partially through the valve body, to a spray orifice; a movable plug disposed at least partially within the valve body; a seat, shaped to conform to a shape of the movable plug; a spring disposed within the valve body. The spring biases the movable plug against the seat to prevent the fluid from flowing through the fluid conduit to the spray orifice when a fluid pressure is below a spray pressure threshold. When the fluid pressure reaches or exceeds the spray pressure threshold, the spring compresses, at least partially retracting the movable plug away from the seat, and allowing the fluid to flow through the fluid conduit to the spray orifice.

10 Claims, 9 Drawing Sheets

PORTABLE AIRLESS FLUID DISPENSING APPARATUS AND VALVES

BACKGROUND

The present disclosure relates generally to fluid dispensing systems and in particular to portable airless paint sprayers.

Portable airless paint sprayers are an ideal tool for hobbyists or do-it-yourselfers to paint surfaces, such as furniture, cabinets, trim, or other architectural structures. Unlike expensive and cumbersome pneumatic paint sprayers, requiring an air compressor and hosing, airless paint sprayers are able to finely atomize fluid paint in a compact, easy to maneuver packaging, providing professional high quality paint finishes.

Typical airless paint sprayers function by pressurizing fluid (e.g., paint, lacquers, stains, or varnishes) up to and exceeding 3000 psi and discharge the pressurized fluid through one or more small, shaped orifices. Such airless paint sprayers pressurize the fluid paint using an electric motor, a gasoline motor, or an air compressor. In larger scale applications, the power unit is connected to a stationary paint source, such as a 5-gallon bucket, and pressurize paint is supplied to a spray gun with a hose. For smaller scale applications, it may be desirable to create a compact paint sprayer, which includes an electrical motor to pressure the paint and an integrated fluid container for holding fluid paint. Such smaller compact airless paint sprayers may be powered for example by a rechargeable 20V battery or alternatively include a power cord to connect to traditional power outlet.

Traditional compact airless paint sprayers, including for example, buzz guns or cup guns, suffer from lack of performance resulting in less-than professional finishes due to, at least in part, the low pressures generated by the smaller electric motors and inferior spray nozzles that are used to accommodate these lower pressures. Thus, it may be desirable to provide a compact handheld airless paint sprayer capable of producing professional grade paint finishes, which uses a smaller electric motor and powered by a rechargeable battery or common electrical outlet.

SUMMARY

A portable airless paint sprayer is disclosed, substantially as illustrated by and described in connection with at least one of the figures, as set forth more completely in the claims.

Specifically, disclosed is an embodiment of a stem-less valve for a fluid spraying apparatus. The stem-less valve comprises a cylindrical valve body, including a sealed end and an open end; a movable plug at least partially disposed within the cylindrical valve body proximate the open end; an air cavity disposed between the movable plug and the sealed end of the cylindrical valve body; at least one seal surrounding the movable plug, operable to seal air within the air cavity; a seat, shaped to conform to a shape of the movable plug; a spray orifice positioned downstream from the seat; a fluid conduit, the fluid conduit being operable to allow a flow of a fluid from a pump, at least partially through the cylindrical valve body, to a spray orifice positioned downstream from the seat; and a spring disposed within the air cavity. The spring is positioned between the sealed end of the cylindrical valve body and the movable plug. The spring biases the movable plug against the seat to prevent the fluid from flowing through the fluid conduit to the spray orifice when a fluid pressure is below a spray pressure threshold. The spring compresses when the fluid pressure reaches or exceeds the spray pressure threshold, at least partially retracting the movable plug away from the seat, and allowing the fluid to flow through the fluid conduit to the spray orifice.

In another embodiment, the spray pressure threshold is between 800 PSI and 2000 PSI. In a further embodiment, the movable plug comprises a cylindrical body and a head joined to the cylindrical body. In some embodiments, the head of the movable plug has a frustoconical shape. In such an embodiment, the cylindrical body of the movable plug includes at least one groove and the groove is operable to receive the at least one seal. In other embodiments, the spring comprises a compression spring. In another embodiment the air cavity when compressed by the movable plug is operable to function as a damper to the spring to reduce vibration of the spring resulting from an operation of the pump or a motor operably connected to the pump. In some embodiments, the spring is isolated from the fluid. In other embodiments the movable plug further comprises a stopper, operable to inhibit the movable plug from retracting away from the seat beyond a preferred distance. Finally, in one embodiment the sealed end comprises a threaded plug, threaded into the cylindrical valve body.

Also disclosed is another embodiment of a stem-less valve for a fluid spraying apparatus. The stem-less valve comprises: a cylindrical valve body, including an upstream end and a downstream end; a fluid conduit, operable to allow a fluid to flow from a pump, through the cylindrical valve body, to a spray orifice positioned downstream from the cylindrical valve body; a movable plug disposed within the cylindrical valve body; a seat, shaped to conform to a shape of the movable plug, the seat being disposed within the cylindrical valve body adjacent the upstream end; and a spring disposed within the cylindrical valve body. The spring biases the movable plug against the seat to prevent the fluid from flowing through the fluid conduit to the spray orifice when a fluid pressure is below a spray pressure threshold. The spring compresses when the fluid pressure reaches or exceeds the spray pressure threshold, at least partially retracting the movable plug away from the seat, and allowing the fluid to flow through the fluid conduit to the spray orifice.

In another embodiment, the cylindrical valve body further comprises: a downstream portion, including a threaded bore; and a removable upstream portion, including threads disposed around the removable upstream portion, wherein: the threads of the removable upstream portion are operable to engage with the threaded bore of the downstream portion to fasten the removable upstream portion to the downstream portion to retain the spring and movable plug within the cylindrical valve body. In some embodiments, the spray pressure threshold is between 800 PSI and 2000 PSI. In other embodiments, spring comprises a compression spring.

Also disclosed is an embodiment of a handheld fluid dispensing apparatus. The handheld fluid dispensing apparatus comprising: a housing, the housing including a handle; an electric motor positioned within the housing, the electrical motor operable to output a rotational motion; a drive, positioned within the housing, operably coupled to the electric motor, the drive operable to convert the rotational motion to a reciprocating linear motion; an actuator disposed on the housing adjacent the handle, the actuator operable to actuate the electric motor; a fluid container mounted to the housing, the fluid container operable to receive and retain a fluid; and a pump, positioned within the housing, operably coupled to drive, the pump operable draw the fluid from the fluid container, pressurize the fluid, and drive the fluid through a stem-less valve to a spray orifice, positioned downstream from the stem-less valve. The stem-less valve comprises: a valve body, the valve body being generally cylindrical; a fluid conduit, operable to allow a flow of the fluid from the pump, at least partially through the valve body, to the spray orifice; a movable plug disposed at least partially within the valve body; a seat, shaped to conform to a shape of the movable plug; a spring disposed within the valve body. The spring biases the movable plug against the seat to prevent the fluid from flowing through the fluid conduit to the spray orifice when a fluid pressure is below a spray pressure threshold. The spring compresses when the fluid pressure reaches or exceeds the spray pressure threshold, at least partially retracting the movable plug away from the seat, and allowing the fluid to flow through the fluid conduit to the spray orifice.

In another embodiment, a tip guard mounted to the housing; the tip guard including a bore; and a reversible spray tip, including a barrel. The barrel is insertable into the bore of the tip guard and rotatable within the bore; and the spray orifice is disposed within the barrel. In some embodiments, the spray pressure threshold is between 800 PSI and 2000 PSI. In other embodiments, the spring comprises a compression spring. In another embodiment, the valve body further comprises an open end and a sealed end; and the movable plug further comprises a cylindrical body, a head, and at least one seal surrounding the cylindrical body; wherein: the cylindrical body of movable plug encloses an air cavity between the movable plug and the sealed end of the cylindrical valve body; and the at least one seal is operable to seal air within the air cavity. In a further embodiment, the head of the movable plug has a frustoconical shape.

Also disclosed is another embodiment of a handheld fluid dispensing apparatus. The handheld fluid dispensing apparatus comprises: a housing, the housing including a handle; an electric motor positioned within the housing, the electrical motor operable to output a rotational motion; a drive, positioned within the housing, operably coupled to the electric motor, the drive operable to convert the rotational motion to a reciprocating linear motion; an actuator disposed on the housing adjacent the handle, the actuator operable to actuate the electric motor; a fluid container mounted to the housing, the fluid container operable to receive and retain a fluid; a pump, positioned within the housing, operably coupled to drive, the pump operable draw the fluid from the fluid container, pressurize the fluid, and drive the fluid downstream of the pump atomize the fluid; a relief valve connected to and positioned downstream of the pump, the relief valve operable to prime the pump and redirect the fluid back into the fluid container when a fluid pressure output by the pump exceeds a relief pressure threshold; a spray valve, connected to and positioned downstream of the relief valve; and a spray tip assembly, connected to and positioned downstream of the spray valve, the spray tip assembly included a spray orifice operable to atomize the fluid.

In such an embodiment, the spray valve comprises: a valve body, the valve body being generally cylindrical; a fluid conduit, operable to allow a flow of the fluid from the relief valve, at least partially through the valve body, to the spray orifice of the spray tip assembly; a frustoconical plug disposed at an end of a stem, wherein the frustoconical plug and the stem are positioned entirely within the valve body; a seat, shaped to conform to a shape of the frustoconical plug; a spring disposed around the stem and positioned within the valve body. The spring biases the frustoconial plug against the seat to prevent the fluid from flowing through the fluid conduit to the spray orifice when a fluid pressure is below a spray pressure threshold. The spring compresses when the fluid pressure reaches or exceeds the spray pressure threshold, at least partially retracting the frustoconical plug and stem away from the seat, and allowing the fluid to flow through the fluid conduit to the spray orifice.

BRIEF DESCRIPTION OF SEVERAL VIEWS OF THE DRAWINGS

The following is a brief description of the drawings pertaining to the present disclosure, which will be discussed in more detail in the detailed description section below.

Figure 1:
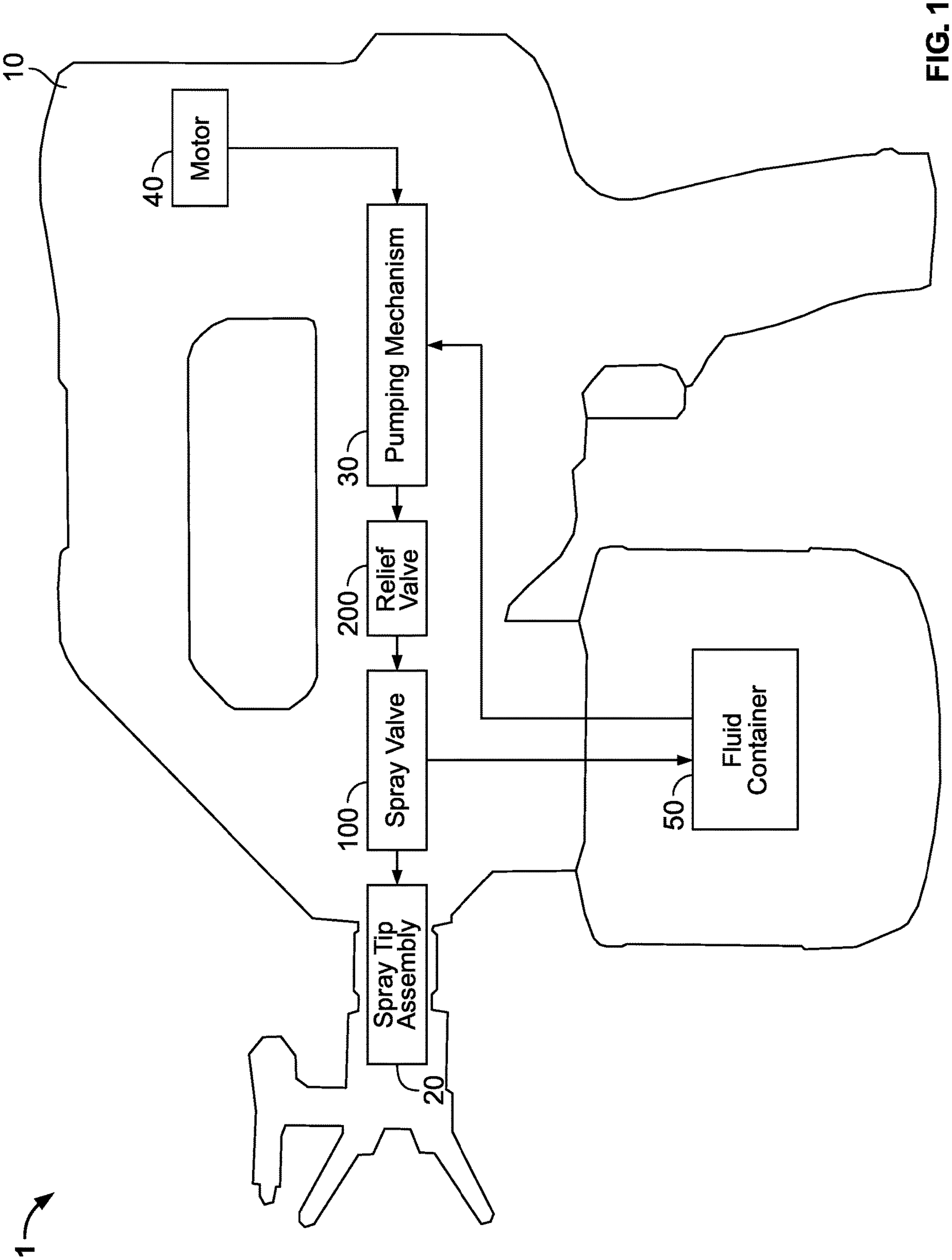
FIG. 1 illustrates a block diagram and outline of core components of an airless fluid dispensing apparatus.

The foregoing summary, as well as the following detailed description of certain features of the present application, are better understood when read in conjunction with the appended drawings. For the purposes of illustration, certain features are shown in the drawings. It should be understood, however, that the claims are not limited to the arrangements shown in the attached drawings. Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of applications comprising one or more embodiments of the disclosure. As such, the drawings are not meant to include all conventional features known by those of ordinary skill in the art to be required for the practice of the embodiments disclosed herein.

DETAILED DESCRIPTION

FIG. 1 illustrates an example block diagram of portable airless fluid dispensing apparatus 1 (the "apparatus"). As shown in the illustrated embodiment, the apparatus 1 generally comprises a compact portable airless spray gun and includes a housing 10, a spray tip assembly 20, a spray valve 100, a relief valve 200, a pumping mechanism 30, a motor 40, and a fluid container 50. The pumping mechanism 30 may comprise for example a gear pump, a piston pump, a plunger pump, a vane pump, a rolling diaphragm pump, a ball pump, a rotary lobe pump, a diaphragm pump or a servomotor having a rack and pinion drive. The motor 40 may comprise for example an electric motor, an air-driven motor, a linear actuator, or a gasoline engine.

The spray valve 100, relief valve 200, pumping mechanism 30, and motor 40 are each at least partially contained in, and packaged within, the housing 10. The spray tip assembly 20 is removably connected to the spray valve 100, for ease of maintenance and cleaning. Likewise, the fluid container 50 is removably connected to the housing 10, such that it can be easily removed to fill with paint or other fluid to be dispensed by the apparatus 1. As shown in FIG. 1, the apparatus is compact because each of the spray tip assembly 20, spray valve 100, relief valve 200, pumping mechanism 30, motor 40, and fluid container 50 are either packaged within or connected to the housing 10. In an alternative embodiment (not shown), the fluid container 50 may be separate from the housing 10. In such an embodiment, the fluid container 50 may be operably connected to the spray tip assembly 20, spray valve 100, relief valve 200, pumping mechanism 30, and motor 40 via a hose (not shown). Further, in another alternative embodiment (not shown), the spray tip assembly 20 and spray valve 100 may be decoupled from the housing 10. In such an embodiment, the spray tip assembly 20 and spray valve 100 are operably connected to the pumping relief valve 200, mechanism 30, motor 40, and fluid container 50 via a hose (not shown).

Regardless of which configuration is being utilized, the portable airless fluid dispensing apparatus 1 generally functions as follows. Fluid contained within the fluid container 50 is drawn into the pumping mechanism 30 and pressurized within the pumping mechanism 30 utilizing power from the motor 40. The pressurized fluid then flows through the relief valve 200 to the spray valve 100. Once a sufficient spray pressure threshold has been reached, the spray valve 100 opens and permits the pressurized fluid to pass to the spray tip assembly 20 and specifically the spray orifice (not shown), which atomizes the fluid upon existing the spray tip assembly 20. An example spray orifice ideally has area between 0.001 to 0.05 square inches and is operable to atomize fluid (e.g., paint, lacquers, stains, or varnishes) to approximately 150 microns or smaller. In operation for example, the pumping mechanism 30 being driven by the motor 40, may generate a spray pressure threshold, of approximately 800-1500 psi. It is however understood that depending on the power of the motor 40, lower or higher spray pressure thresholds may be achieved. For example, in larger form factor examples, a spray pressure threshold of approximately 1000 to 3000 PSI may be desirable. When fluid pressure exceeds the spray pressure threshold, the relief valve 200 is operable to release some of the pressurized fluid back into the fluid container 50 if the fluid pressure has reached a relief pressure threshold. A typical relief pressure threshold is 2500-3000 PSI, but may be higher depending on the size and spray pressure threshold of the apparatus 1. Likewise, the relief valve 200 is operable to expose the pump 30 to atmospheric pressure to prime the pump 30.

Figure 2:
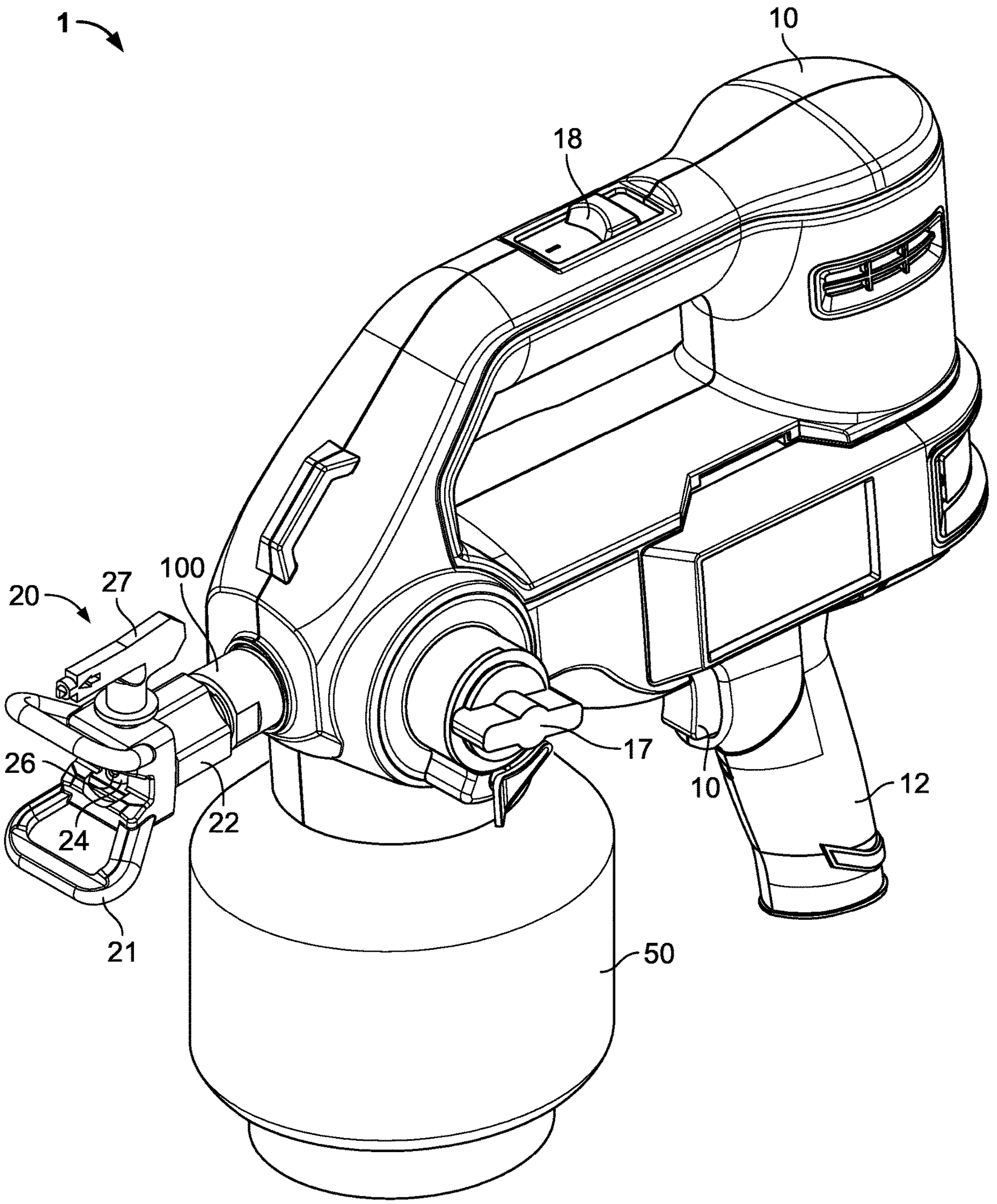
FIG. 2 illustrates an assembled perspective view of an airless fluid dispensing apparatus.
Figure 3:
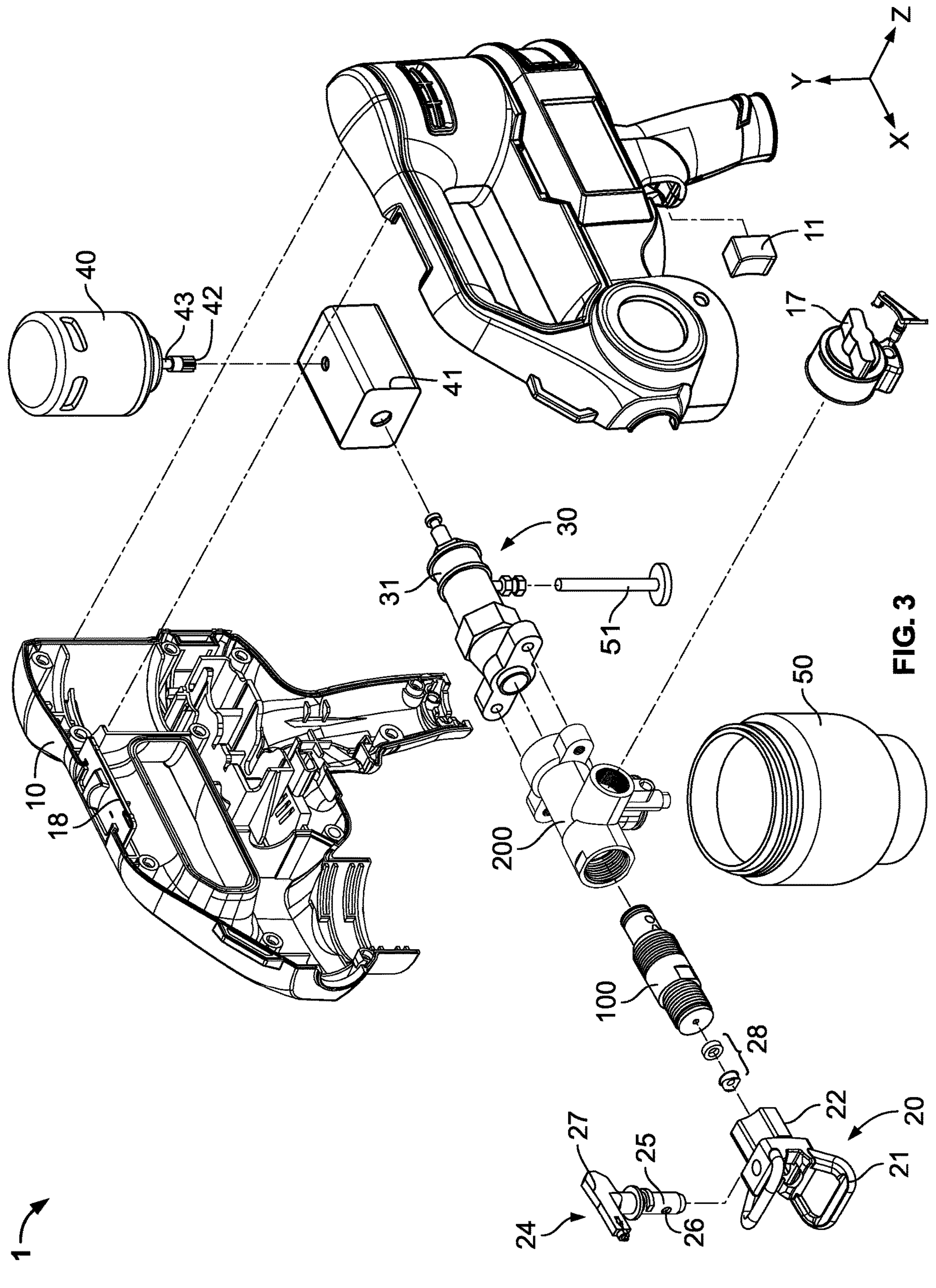
FIG. 3 illustrates an exploded perspective view of an airless fluid dispensing apparatus, including a spray valve and a relief valve.

FIGS. 2-3 illustrate an exploded and assembled example of the airless fluid dispensing apparatus 1. As illustrated, the apparatus 1 includes the spray tip assembly 20, the pumping mechanism 30, and the motor 40 disposed within the housing 10. Positioned between, and connected to, the spray tip assembly 20 and the pumping mechanism 30 are the spray valve 100 and the relief valve 200. The example apparatus 1 also includes a trigger 11, integrated handle 12, and a power source (not shown), which are each integrated into or operably coupled to the housing 10. The apparatus 1 may additionally include a priming switch 17, and a pressure selector 18. The power source includes circuitry to provide power to the motor 40. The power source may be, for example, a rechargeable battery or a power cord to plug into conventional outlets. The fluid container 50 is operably coupled to the housing 10 threads integrated with the housing 10. The pressure relief valve 200 is operably coupled to the pumping mechanism 30, and is operable to open the pumping mechanism 30 to atmospheric pressure. Further, as illustrated, the spray tip assembly 20 includes a spray tip 21, a connector 22, and a tip guard 21. The tip guard 21 is connected to connector 22 to prevent any objects from interfering or contacting a high velocity output of fluid from spray tip 21.

The fluid container 50 contains any fluid (e.g., paint, lacquer, stain, varnish, etc.), which is suitable for being atomized and sprayed by the apparatus 1. The fluid container 50 is operably coupled to the remainder of the apparatus 1, and specifically to the pumping mechanism 30 and spray tip assembly 20. In one example, the trigger 11 is operationally connected to the power source 13 and motor 40, such that when the trigger 11 is actuated, power from the power source 13 activates the motor 40. The motor 40 in turn provides power input into the pumping mechanism 30, which draws fluid from the fluid container 50 via a suction tube 51. Specifically, the motor 40 is operably coupled to the pumping mechanism 30 by a connecting assembly 41 and gearing assembly 42. The pumping mechanism 30 pressurizes the fluid and forces the pressurized fluid through the spray tip assembly 20.

Figure 4:
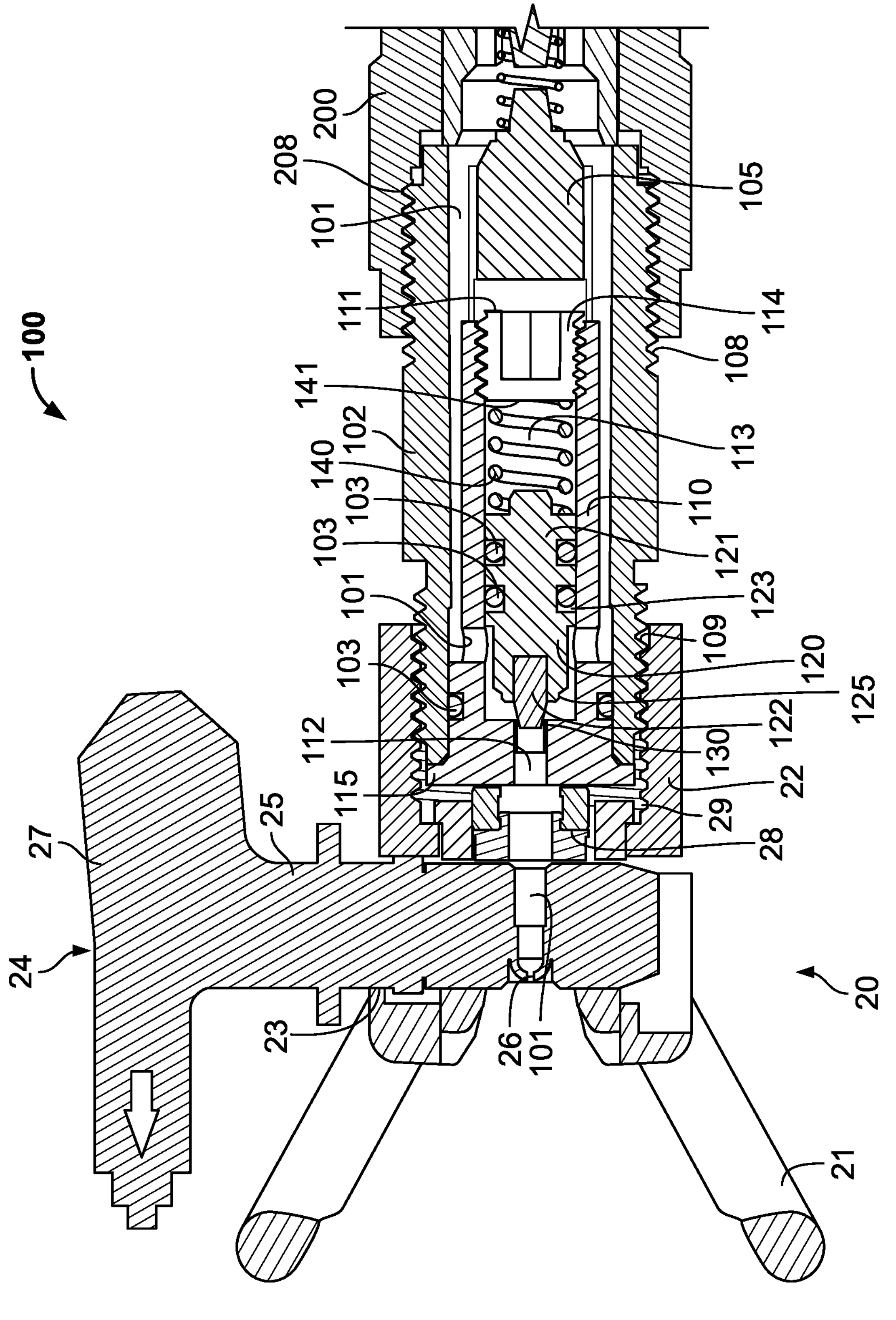
FIG. 4 illustrates a partial cross-sectional view of one embodiment of the spray valve shown in FIG. 3, taken along the X-Y plane.
Figure 5:
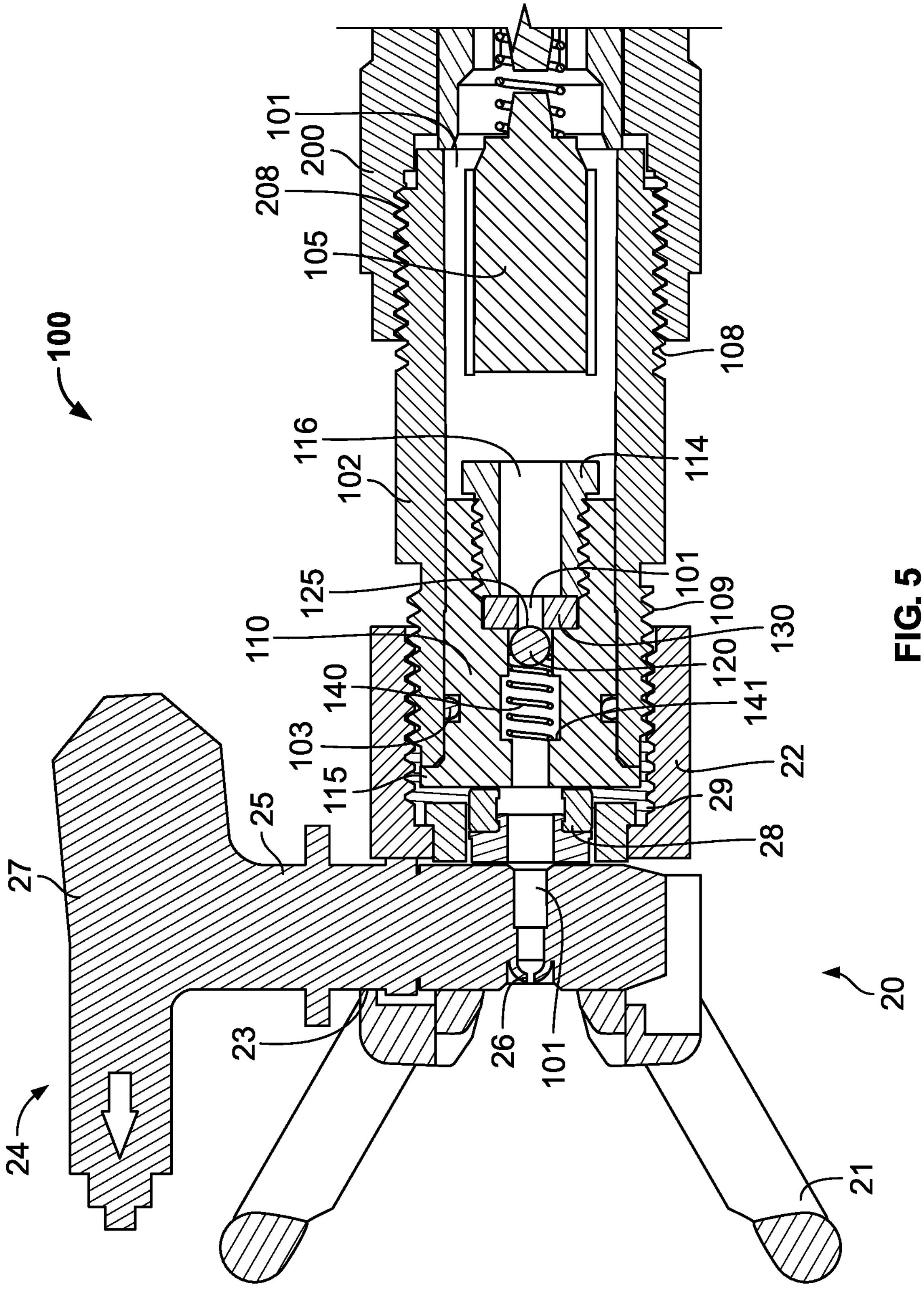
FIG. 5 illustrates a partial cross-sectional view of another embodiment of the spray valve shown in FIG. 3, taken along the X-Y plane.
Figure 6:
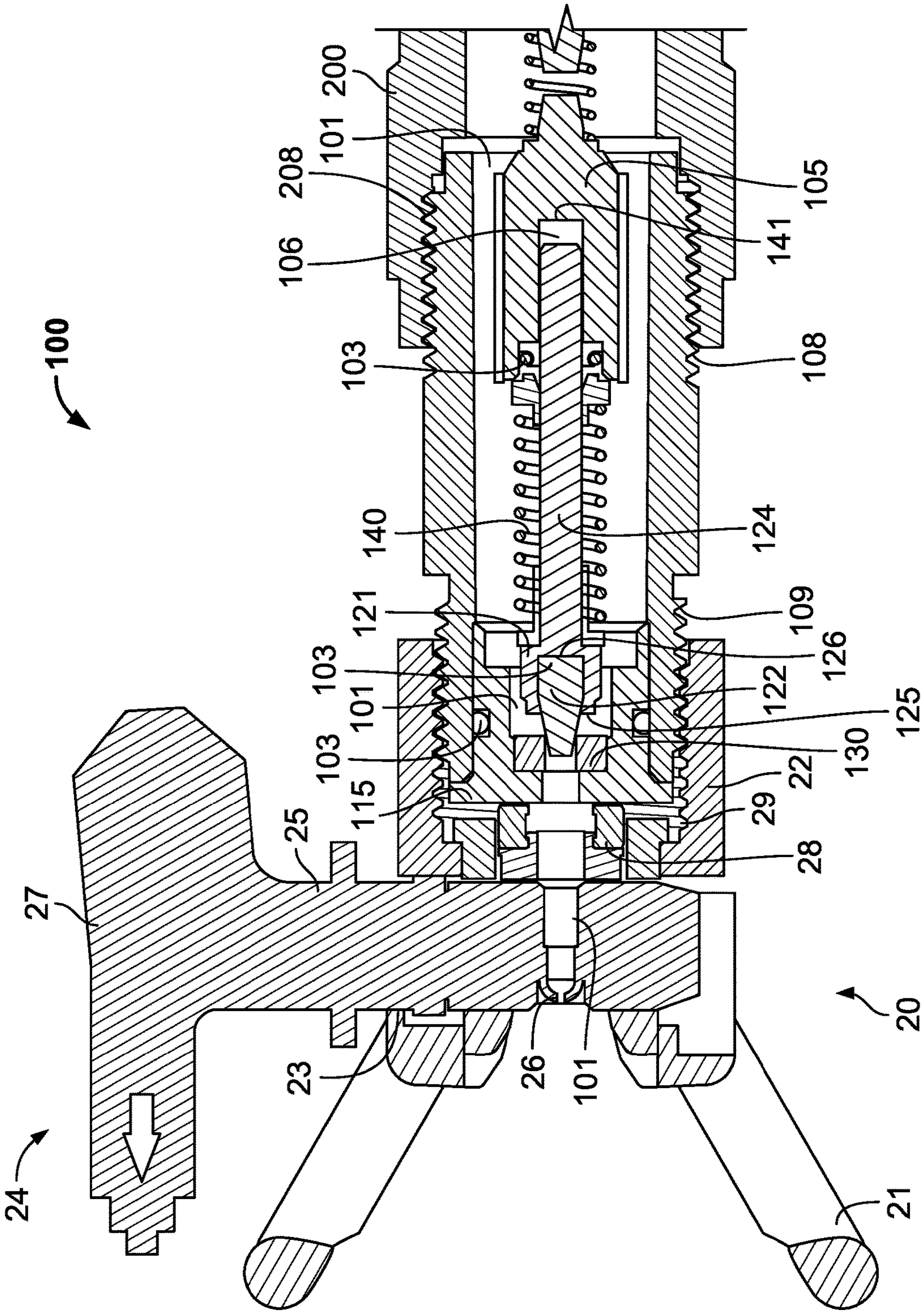
FIG. 6 illustrates a partial cross-sectional view of another embodiment of the spray valve shown in FIG. 3, taken along the X-Y plane.

As shown in FIGS. 4-6, the spray tip assembly 20 includes the tip guard 21, connector 22, and a bore 23 for inserting a spray tip 24. The spray tip 24 includes a barrel 25, a spray orifice 26 disposed within the barrel 25, and a tip flag 27. Further, a saddle seal 28 is operable to seal the barrel 25 against the spray valve 100 ensuring no fluid escapes the fluid conduit 101. As illustrated, the connecter 22 operably couples the spray tip assembly 20 to the apparatus 1 via spray valve threads 29, which engage with corresponding tip guard threads 109 on the spray valve 100. The spray tip 24 is inserted through the bore 23. Specifically, the barrel 25 of the spray tip 24 is inserted through into the bore 23. In one example, the barrel 25 comprises either a removable spray tip or a reversible spray tip that rotates within tip guard 21. The spray orifice 26 receives the forced flow of the pressurized fluid (at the spray pressure threshold) from the pumping mechanism 30. The pressurized fluid is atomized as it is forced through the spray orifice 26. The tip flag 27 is operable to indicate the direction of the spray of the fluid.

The apparatus 1 may further include a circuit board (not shown), operable to control the motor 40. For example, the circuit board may be programmed to alter the current and/or voltage supplied to drive motor 40 to alter the flow from the pumping mechanism 30. Likewise, the circuit board may be programmed to use pulse width modulation (PWM) to slow output of the motor 40 when high current is being drawn from the power source. Additionally, the circuit board may include a temperature sensor 16, operable to monitor temperatures of the motor 40 and/or power source.

Figure 7:
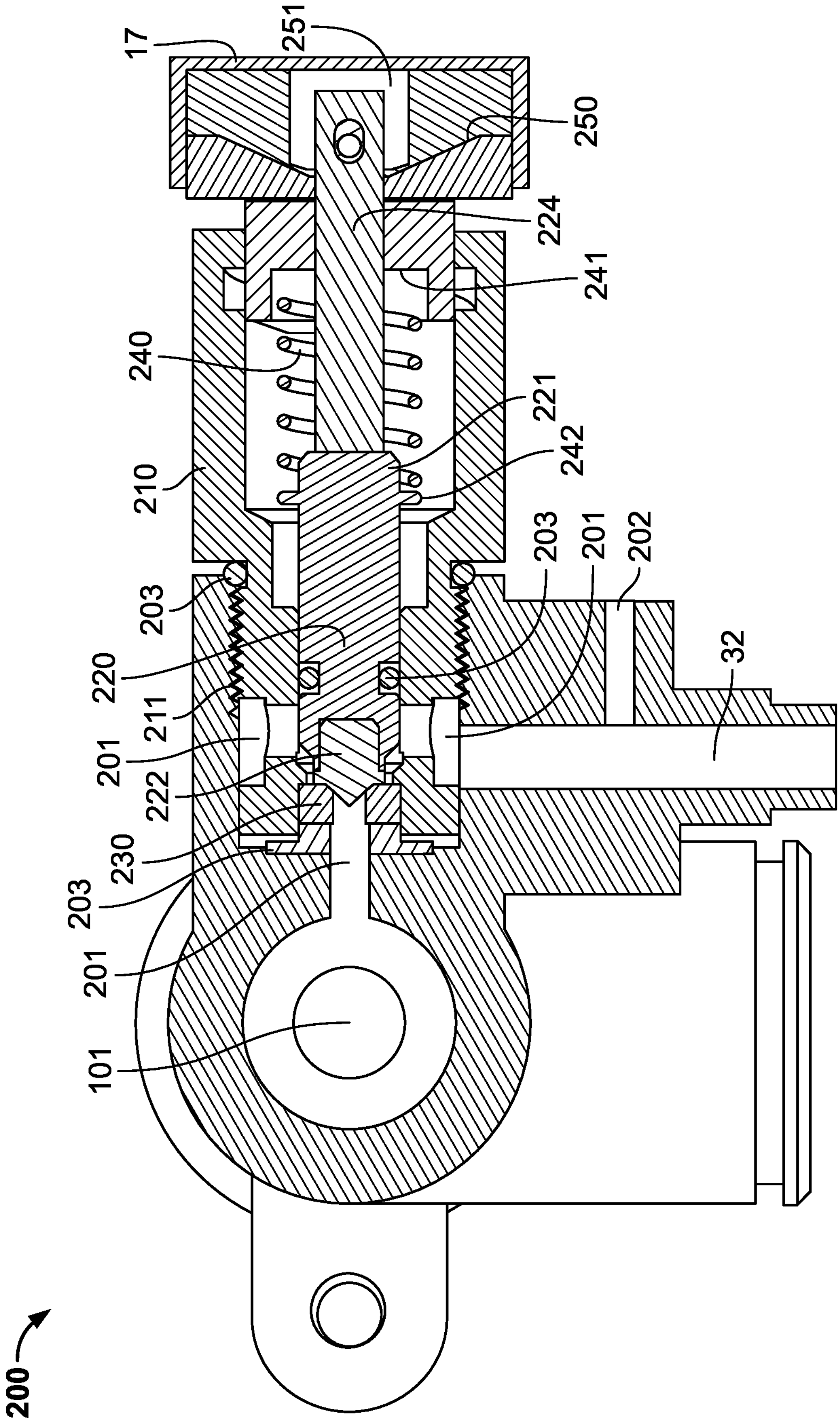
FIG. 7 illustrates a partial cross-sectional view of one embodiment of the relief valve shown in FIG. 3, taken along the Z-Y plane.
Figure 8:
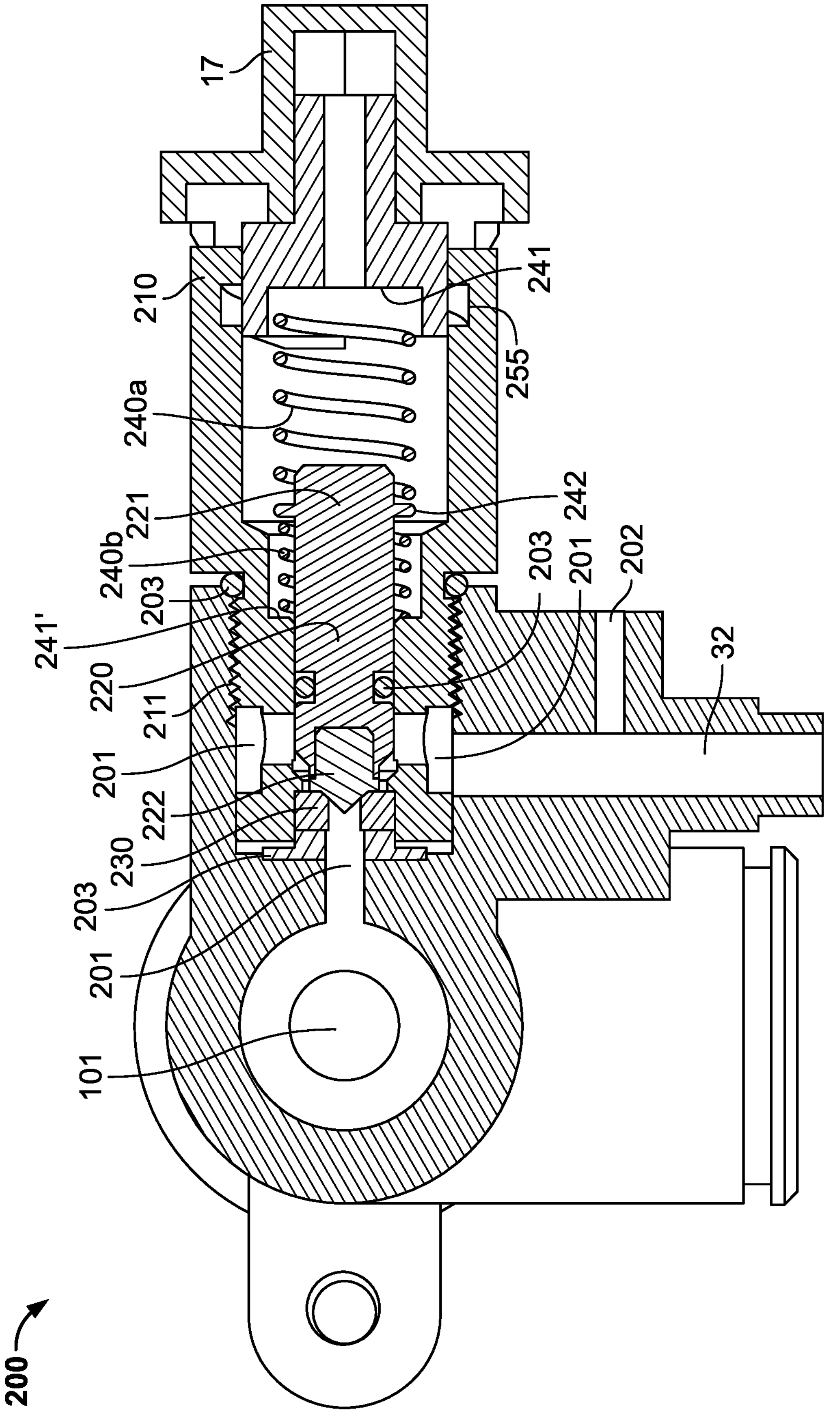
FIG. 8 illustrates a partial cross-sectional view of another embodiment of the relief valve shown in FIG. 3, taken along the Z-Y plane.
Figure 9:
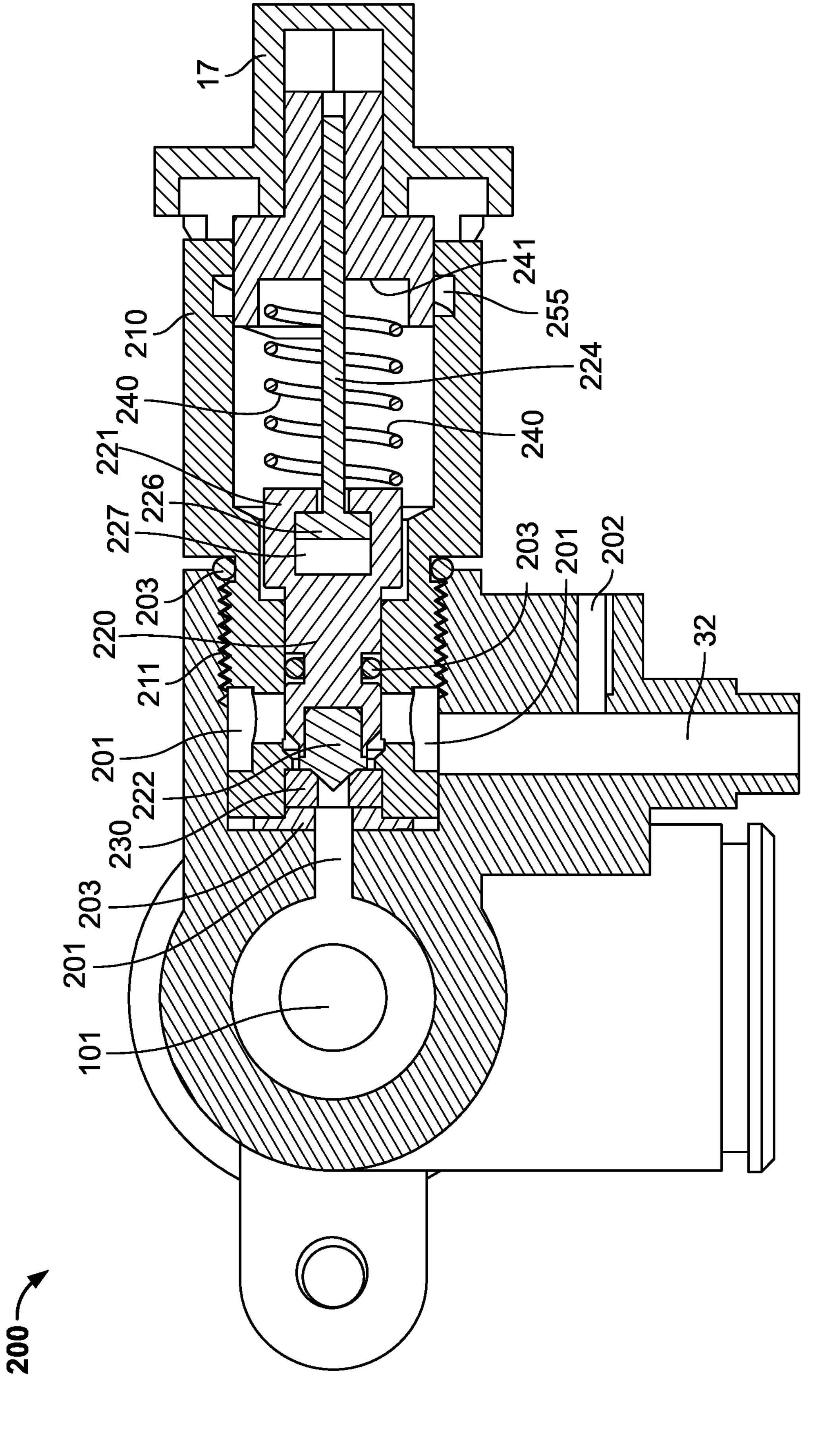
FIG. 9 illustrates a partial cross-sectional view of another embodiment of the relief valve shown in FIG. 3, taken along the Z-Y plane.

The apparatus 1 depicted in FIGS. 2 and 3, may be operated as follows. An operator fills the fluid container 50 with fluid, for example paint, which the operator intends to spray on a work piece. The operator actuates the trigger 11, which in-turn activates the motor 40. Drawing power from the power source 13, the motor 40 rotates a drive shaft 43, which is connected to gearing 42. The gearing 42 in-turn causes the connecting assembly 41 to actuate the pumping mechanism 30. The pumping mechanism 30 draws fluid from the fluid container 50 using suction tube 51. In one example, excess fluid that cannot be processed (to be pressurized) by pumping mechanism 30 is returned to fluid container 50 through relief valve 200 and return line 32 (as shown in FIGS. 7-9). Pressurized fluid from pumping mechanism 30 flows through the relief valve 200 to the spray valve 100. Once the fluid pressure reaches or exceeds the spray pressure threshold, the spray valve 100 opens to allow the pressurized fluid into the barrel 25 of spray tip 21, which includes the spray orifice 26. The pressurized fluid is then forced through the spray orifice 26, which atomizes the pressurized fluid as the fluid leaves apparatus 1. If the fluid pressure reaches or exceeds a relief pressure threshold, the relief valve 200 opens to allow some or all of the pressurized fluid to return to the fluid container 50.

FIGS. 4-6 show cross-sectional views of different embodiments of the spray valve 100 shown in FIG. 3, taken along the X-Y plane. Spray valve 100 can either be a stem-less valve (FIGS. 4 and 5) or a stemmed valve (FIG. 6). As illustrated, the spray valve 100 includes the fluid conduit 101, an outer wall 102, relief valve threads 108, and tip guard threads 109. The spray valve 100 attaches to the relief valve 200 by engaging the relief valve threads 108 with corresponding spray valves threads 208 on the relief valve 200. Likewise, the spray tip assembly 20 attaches to the spray valve 100 by engaging the spray valve threads 29 of the spray tip assembly 20 with the corresponding tip guard threads 109 of the spray valve 100.

Each of the spray valves 100 shown FIGS. 4-6 include valve body 110 disposed within the outer wall 102 of the spray valve 100. The valve body 110 is typically cylindrical, but other shapes are possible. The valve body 110 has an upstream end (proximate the relief valve 200) and a downstream end (proximate the spray tip assembly 20). Further, each of the spray valves 100 include a movable plug 120 (e.g., a poppet, ball, etc.), a seat 130, a spring 140 (e.g., a compression spring), and one or more seals 103 (e.g., O-Ring) disposed at least partially within or connected to the valve body 110. Although the valves shown in FIGS. 4-6 include different internal structures to mount, brace, and position the movable plug 120, seat 130, and spring 140, each of the spray valves 100 functions generally as follows.

The spring 140 biases the movable plug 120 towards the seat 130. The movable plug 120 and seat 130 are positioned in-line with the fluid conduit 101, such that when the movable plug 120 is seated on the seat 130, the fluid conduit 101 is blocked and fluid cannot pass beyond the movable plug 120. Thus, when the apparatus 1 is turned off or if the fluid pressure of the fluid is below the spray pressure threshold, the movable plug 120 is seated on the seat 130 in closed position, and fluid is not capable of passing through the fluid conduit 101. When the apparatus 1 is activated by actuating trigger 11 (as described above), the pumping mechanism 30 draws fluid from the fluid container 50 and begins to pressurize the fluid. When the fluid pressure, of the fluid within the fluid conduit 101 reaches the spray pressure threshold, which correlates to the force required to compress or deform spring 140, the movable plug 120 retracts and/or is separated from the seat 130 in an open position. At this point, fluid can pass through the fluid conduit 101 to the spray trip 24 (and spray orifice 26). It is understood that the spray pressure threshold can by increased or decreased by adjusting the spring rate of the spring 140. For example replacing the spring 140 with a different spring having a lower or greater spring rate (i.e., the force a spring exerts as calculated by Hooke's law) may cause the spray pressure threshold to change.

As illustrated in FIGS. 4-6, the valve body 110 includes a flange 115 at the downstream end of the valve body 110. Further as illustrated, the valve body 110 has an outer diameter that is smaller than the inner diameter of the outer wall 102, such there is a cavity (i.e., the fluid conduit 101) between the valve body 100 and outer wall 102. The valve body 110 may also include one or more seals 103 (e.g., O-ring positioned in a groove), to prevent leakage of the fluid when the valve body 110 is installed in the spray valve 100. The valve body 110 is attached to the outer wall 102 (and in turn to the apparatus 1), by inserting the valve body 110 into the cylinder formed by the outer wall 102 until the flange 115 is in contact with the outer wall 102. When the spray tip assembly 20 is attached to the spray valve 100 (as described above), the valve body 110 is pinched between the spray tip assembly 20 (and specifically the saddle seal 28) and the outer wall 102.

The spray valve 100 may also include an anchor portion 105 positioned generally upstream from the valve body 110. The anchor portion 105 may be integral with the outer wall 102 (i.e., machined from a single piece of material) or fastened within the outer wall 102. The anchor portion 105 is operable to provide a fixed anchor location for one or more spring(s) 140 or 240. The valve body 110 and outer wall 102 of the spray valve 100 may be machined metal (e.g., aluminum or stainless steel) or any other suitable material capable or withstanding the fluid pressure.

FIG. 4 specifically shows a stem-less spray valve 100 including multi-piece movable plug 120 and an air cavity 113 within the valve body 110. Also shown is the seat 130, which is integral with the valve body 110, and is shaped to conform to the shape of the movable plug 120. Specifically, the movable plug 120 includes a cylindrical body 121 and a head 122. As illustrated, the head 122 has a frustoconical shape, but other shapes are also possible (e.g., cone shaped, dome shape, pyramid shape, etc.). The head 122 may be made of any suitable material (e.g., Carbide, Tungsten, Ultra High Molecular Weight Polyethylene ("UPE"), Polyurethane ("PU"), etc.) capable for providing a firm seal against the seat 130. As illustrated, the valve body 110 includes a sealed end 111 (sealed by a threaded plug 114) and an open end 112 (i.e., the fluid conduit 101). The movable plug 120 further includes one or more seals 103 (e.g., O-ring) positioned around the movable plug 120 in a groove 123. The seal(s) 103 seal air in the air cavity 113 disposed between the movable plug 120 and the sealed end 111, and specifically a threaded plug 114, of the valve body 110. Sealed end 111 functions as an anchor to the spring 140 and a stopper 141 to biasing movable plug 120, operable to limit the retraction of the movable plug 120 to a preferred distance to prevent dislocation of the movable plug 120. The air cavity 113 (and the air therein) when compressed by the movable plug 120 functions as a damper to the spring 140 to reduce vibration of the spring 140 resulting from an operation of the pump 31 or the motor 40 operably connected to the pump 31. Further, the seal 103 isolates the spring 140 from the fluid.

As illustrated in FIG. 4 (but also applicable to FIGS. 5 and 6) the movable plug 120 has a vertical or partially vertical surface 125 exposed to the fluid cavity 101. The cylindrical body 121 and/or head 122 of the movable plug 120 must have a sufficient vertical portion 125 for the fluid to push against, such that the normal force is generally parallel to the spring force direction of the spring 140.

To assemble the spray valve 100 of FIG. 4, first, the movable plug 120 is inserted into the valve body 110 at the downstream end. Second, the spring 140 is inserted into the valve body 110 at the downstream end. Third, the threaded plug 114 is threaded onto corresponding threads of the valve body 110. The threaded plug 114 operable to adjust spring load and the spray pressure threshold (i.e., cracking pressure threshold) of the spring 140. For example, threading the threaded plug 114 in or out of the valve body 110 the spring load is either increased or decreased. More specifically, the more the threaded plug 114 is threaded into the valve body 110, the greater the spring load on the spring 140 and the less the threaded plug 114 is threaded into the valve body 110, the lesser the spring load on the spring 140. Having the ability to adjust the spring load as described, has certain manufacturing benefits. For example, a manufacturer has the ability to finely dial-in the spray pressure threshold. Further, the material tolerances for the spring 140 can be reduced, resulting in reduced cost. Fourth, the valve body 110 joined with the outer wall 102 and spray tip assembly 20 as described above. Finally, the ease of assembly also allows for ease of disassembly, which is essential to properly clean and maintain the apparatus 1.

FIG. 5 shows another embodiment of a stem-less spray valve 100. The spring 140 is positioned within the fluid conduit 101 between the stopper 141 and the movable plug 120. The movable plug 120 as illustrated is spherical, but other shapes are possible (e.g., frustoconical, conical, pyramid, dome, etc.). Also shown is the seat 130 that is shaped to conform to the shape of the movable plug 120. The seat 130 is a separate component from the valve body 110 and is inserted into the valve body 110 at the downstream end. Threaded plug 114 (i.e., the removable upstream portion) including a plug aperture 116 (i.e., the fluid conduit 101) is threaded onto corresponding threads on the downstream end of the valve body 110. Likewise, the thread plug 114 is operable to adjust spring load and the spray pressure threshold (i.e., cracking pressure) of the spring 140 as describe above. Here, the spring 140 is exposed to the fluid during operation of the apparatus 1.

FIG. 6 shows an embodiment of a stemmed spray valve 100. Here, the spray valve 100 includes a multi-piece movable plug 120 consisting of a cylindrical body 121 and head 122 attached to a stem 124. The stem 124 generally cylindrical and is partially disposed within an anchor bore 106 of the anchor portion 105. A stopper 141' is located in the upstream portion of the anchor bore 106. The stopper 141' prevents the movable plug 120 from extending beyond a certain distance within the anchor bore 106. The spring 140 is positioned between the cylindrical body 121 and the anchor 105. The spring 140 is exposed to the fluid during operation of the apparatus 1. A seal 103" isolates portion of the stem 124 disposed within the anchor bore 106 from the fluid.

FIGS. 7-9 show cross-sectional views of different embodiments of the pressure relief valve 200 shown in FIG. 3, taken along the Z-Y Plane. The relief valve 200 can be either a stem-less valve (FIG. 8) or a stemmed valve (FIGS. 7 and 9). As illustrated in FIGS. 4-6, the relief valve 200 includes spray valve threads 208, which engage with the corresponding relief valve threads 108 of the spray valve 100, when the spray valve 100 is attached to the relief valve 200. The relief valve 200 also includes one or more other mounting locations (not shown), which are optionally operable to receive a corresponding fastener (not shown) to mount the relief valve 200 to the housing 10. Finally, the relief valve 200 includes a pump interface (not shown), which is operable to operably couple to the pumping mechanism 30 and receive fluid through the fluid conduit 101.

As illustrated in FIGS. 7-9, the relief valve 200 includes a relief conduit 201, which intersects the fluid conduit 101. As illustrated, the upstream portion of the relief conduit 201 is generally perpendicular to the fluid conduit 101, but it is understood that other arrangements are possible. The relief conduit 201 leads to both a return line 32 and air vent 202. A seat 230 and a movable plug 220 are disposed along the relief conduit 201 blocking the relief conduit until either the operator manually opens relief valve 200 to prime the pump or fluid pressure has exceeded the relief pressure threshold. In the former, air contained within pump 31, fluid conduit 101, and/or relief conduit 201 is purged via the air vent 202. At the same time, the air is replaced with fluid drawn from the fluid container 50. In the latter, some of the pressurized fluid is permitted to flow past the movable plug 220 through the relief conduit 201 to the return line 32 back into the fluid container 50.

Each of the relief valves 200 shown FIGS. 7-9 include valve body 210, which includes threads 211, operable to engage with corresponding threads on the relief valve 200. The valve body 210 is typically cylindrical, but other shapes are possible. The valve body 210 includes one or more seal(s) 203 (e.g., seal ring, O-ring with corresponding groove), etc.), which are operable to prevent any fluid from leaking out of the relief valve 200. Further, each of the relief valves 200 include the movable plug 220 (e.g., a poppet, ball, etc.), the seat 230, the spring 240. Although the relief valves 200 shown in FIGS. 7-8 include different internal structures to mount, brace, and position the movable plug 220 and spring 140, each of the relief valves 200 functions generally as follows.

The spring 240 biases the movable plug 220 towards the seat 230. The movable plug 220 and seat 230 are positioned in-line with the relief conduit 201, such that when the movable plug 220 is seated on the seat 230, the relief conduit 201 is blocked and fluid (or air) cannot pass beyond the plug 220. As discussed above, relief valve 200 can be opened in one of two ways. Manually compressing the spring 240 via the priming switch can be compressed manually using the priming switch 17, or by fluid pressure if the fluid pressure has reached the relief pressure threshold. Specifically, the pressurized fluid pushes against a head 222, which compresses the spring 240 and retracts the movable plug 220 from the seat 230. The relief pressure threshold correlates to the force required to compress or deform the spring 240. It is understood that the relief pressure threshold can by increased or decreased by adjusting the spring rate of the spring 240. For example replacing the spring 240 with a different spring having a lower or greater spring rate (i.e., the force a spring exerts as calculated by Hooke's law).

FIG. 7 shows one embodiment of the relief valve 200 including a stem 224 connected to a cam 251. When the purging switch 17 is rotated, the cam 251 interferes with a cam plate 250, which conversely pulls the stem 224, compresses the spring 240, and retracts the movable plug 240 from the seat 230. The stem 224 extends from the movable plug 220, and in some instances is integral with the movable plug 220. The movable plug 220 also includes a spring flange 242, operable to anchor the spring 240. The spring 240 is positioned between the spring flange 242 and a stopper 241.

FIG. 8 shows another embodiment of the relief valve 200, including two springs 240*a* and 240*b*. As illustrated, spring 240*a* is positioned entirely around the cylindrical body 221 of the movable plug 220 between a stopper 241' and a spring flange 242. A larger spring 240*b* is positioned partially around the cylindrical body 221 of the movable plug 220 between the spring flange 242 and stopper 241. The present disclosure also contemplates the inverse arrangement. Here, the spring rate of spring 240*b* determines the relief pressure threshold. Conversely, spring 240*a* has a lower spring rate and assists in retracting the movable plug 220 from the seat 230, when the relieve valve is opened manually. Also shown are course buttress threads 255, operable to shift the springs 240*a* and 240*b* and the movable plug laterally, when the purging switch 17 is twisted.

FIG. 9 shows another embodiment of the relief valve 200, including a stem 224 including a hook 226, positioned in a hook cavity 227 of the movable plug 220. A spring 240 is positioned around the stem 224 between the body 221 of the plug and a stopper 241. Also shown are course buttress threads 255, operable to shift the stem 224 and the movable plug 220 laterally, when the purging switch 17 is twisted. Specifically, when the purging switch 17 is turned, the hook 226 abuts against a sidewall of the hook cavity, which compresses the spring 240 and retracts the movable plug 220 from the seat 230. The hook cavity 227 is sized to accommodate the lateral movement of the stem 224 resulting from twisting the purging switch 17, engaging the course buttress threads 255.

The present described disclosure is described in such full, clear, concise, and exact terms as to enable any person skilled in the art to which it pertains to practice the same. It is to be understood that the foregoing described preferred aspects of the disclosure and that modifications may be made therein without departing from the spirit of scope of the disclosure as set forth in the appended claims. The scope of the following claims is to be accorded the broadest interpretation to encompass all such modifications and equivalent structures and functions. Therefore, it is intended that the application not be limited to the particular aspects disclosed, but that the application will include all aspects falling within the scope of the appended claims.

What is claimed:

1. A stem-less valve for a fluid spraying apparatus, comprising:
- a cylindrical valve body, including a downstream portion including a threaded bore, and a removable upstream portion, including threads disposed around the removable upstream portion;
- a fluid conduit, operable to allow a fluid to flow from a pump, through the cylindrical valve body, to a spray orifice positioned downstream from the cylindrical valve body;
- a movable plug disposed within the cylindrical valve body;
- a seat, shaped to conform to a shape of the movable plug, the seat being disposed within the cylindrical valve body adjacent the upstream portion;
- a spring disposed within the cylindrical valve body, wherein:
  - the threads of the removable upstream portion are operable to engage with the threaded bore of the downstream portion to fasten the removable upstream portion to the downstream portion to retain the spring; and movable plug within the cylindrical valve body;
  - the spring biases the movable plug against the seat to prevent the fluid from flowing through the fluid conduit to the spray orifice when a fluid pressure is below a spray pressure threshold; and
  - the spring compresses when the fluid pressure reaches or exceeds the spray pressure threshold, at least partially retracting the movable plug away from the seat, and allowing the fluid to flow through the fluid conduit to the spray orifice.

2. The stem-less valve of claim 1, wherein the spray pressure threshold is between 800 PSI and 2000 PSI.

3. The stem-less valve of claim 1, wherein the spring comprises a compression spring.

4. A handheld fluid dispensing apparatus, the handheld fluid dispensing apparatus comprising:
- a housing, the housing including a handle;
- an electric motor positioned within the housing, the electrical motor operable to output a rotational motion;
- a drive, positioned within the housing, operably coupled to the electric motor, the drive operable to convert the rotational motion to a reciprocating linear motion;
- an actuator disposed on the housing adjacent the handle, the actuator operable to actuate the electric motor;
- a fluid container mounted to the housing, the fluid container operable to receive and retain a fluid;
- a pump, positioned within the housing, operably coupled to drive, the pump operable draw the fluid from the fluid container, pressurize the fluid, and drive the fluid through a stem-less valve to a spray orifice, positioned downstream from the stem-less valve;
- the stem-less valve comprising:
  - a valve body, the valve body being generally cylindrical;
  - a fluid conduit, operable to allow a flow of the fluid from the pump, at least partially through the valve body, to the spray orifice;
  - a movable plug disposed at least partially within the valve body;
  - a seat, shaped to conform to a shape of the movable plug;
  - a spring disposed within the valve body, wherein:
    - the spring biases the movable plug against the seat to prevent the fluid from flowing through the fluid conduit to the spray orifice when a fluid pressure is below a spray pressure threshold; and
    - the spring compresses when the fluid pressure reaches or exceeds the spray pressure threshold, at least partially retracting the movable plug away from the seat, and allowing the fluid to flow through the fluid conduit to the spray orifice.

5. The handheld fluid dispensing apparatus of claim 4, further comprising:
- a tip guard mounted to the housing; the tip guard including a bore; and
- a reversible spray tip, including a barrel, wherein:
  - the barrel is insertable into the bore of the tip guard and rotatable within the bore; and
  - the spray orifice is disposed within the barrel.

6. The handheld fluid dispensing apparatus of claim 4, wherein the spray pressure threshold is between 800 PSI and 2000 PSI.

7. The handheld fluid dispensing apparatus of claim 4, wherein the spring comprises a compression spring.

8. The handheld fluid dispensing apparatus of claim 4, wherein:
- the valve body further comprises an open end and a sealed end; and the movable plug further comprises a cylindrical body, a head, and at least one seal surrounding the cylindrical body; wherein:

the cylindrical body of movable plug encloses an air cavity between the movable plug and the sealed end of the cylindrical valve body; and the at least one seal is operable to seal air within the air cavity.

9. The handheld fluid dispensing apparatus of claim 8, wherein the head of the movable plug has a frustoconical shape.

10. A handheld fluid dispensing apparatus, the handheld fluid dispensing apparatus comprising:

a housing, the housing including a handle;

an electric motor positioned within the housing, the electrical motor operable to output a rotational motion;

a drive, positioned within the housing, operably coupled to the electric motor, the drive operable to convert the rotational motion to a reciprocating linear motion;

an actuator disposed on the housing adjacent the handle, the actuator operable to actuate the electric motor;

a fluid container mounted to the housing, the fluid container operable to receive and retain a fluid;

a pump, positioned within the housing, operably coupled to drive, the pump operable draw the fluid from the fluid container, pressurize the fluid, and drive the fluid downstream of the pump atomize the fluid;

a relief valve connected to and positioned downstream of the pump, the relief valve operable to prime the pump and redirect the fluid back into the fluid container when a fluid pressure output by the pump exceeds a relief pressure threshold;

a spray valve, connected to and positioned downstream of the relief valve;

a spray tip assembly, connected to and positioned downstream of the spray valve, the spray tip assembly included a spray orifice operable to atomize the fluid, wherein the spray valve comprises:

a valve body, the valve body being generally cylindrical;

a fluid conduit, operable to allow a flow of the fluid from the relief valve, at least partially through the valve body, to the spray orifice of the spray tip assembly;

a frustoconical plug disposed at an end of a stem, wherein the frustoconical plug and the stem are positioned entirely within the valve body;

a seat, shaped to conform to a shape of the frustoconical plug;

a spring disposed around the stem and positioned within the valve body, wherein:

the spring biases the frustoconial plug against the seat to prevent the fluid from flowing through the fluid conduit to the spray orifice when a fluid pressure is below a spray pressure threshold; and the spring compresses when the fluid pressure reaches or exceeds the spray pressure threshold, at least partially retracting the frustoconical plug and stem away from the seat, and allowing the fluid to flow through the fluid conduit to the spray orifice.

* * * * *